(12) United States Patent
Schoonmaker et al.

(10) Patent No.: US 10,057,111 B2
(45) Date of Patent: Aug. 21, 2018

(54) VEHICLE CONSIST CONFIGURATION CONTROL

(71) Applicant: General Electric Company, Schenectady, NY (US)

(72) Inventors: William Cherrick Schoonmaker, Melbourne, FL (US); Jared Klineman Cooper, Palm Bay, FL (US); Michael Alexander, West Melbourne, FL (US)

(73) Assignee: General Electric Company, Schenectady, NY (US)

( * ) Notice: Subject to any disclaimer, the term of this patent is extended or adjusted under 35 U.S.C. 154(b) by 229 days.

(21) Appl. No.: 14/959,080

(22) Filed: Dec. 4, 2015

(65) Prior Publication Data

US 2017/0163474 A1   Jun. 8, 2017

(51) Int. Cl.
*H04L 12/24*   (2006.01)
*H04L 29/08*   (2006.01)
*B61C 17/12*   (2006.01)

(52) U.S. Cl.
CPC .......... *H04L 41/0659* (2013.01); *H04L 67/12* (2013.01); *B61C 17/12* (2013.01); *H04L 41/0672* (2013.01)

(58) Field of Classification Search
CPC .. H04L 41/06; H04L 41/0659–41/0663; H04L 41/0672; H04L 41/0813–41/0816; H04L 67/12–67/125; B61C 17/12
See application file for complete search history.

(56) References Cited

U.S. PATENT DOCUMENTS

| | | |
|---|---|---|
| 6,088,368 A | 7/2000 | Rubinstain et al. |
| 8,532,850 B2 | 9/2013 | Cooper et al. |
| 8,583,299 B2 | 11/2013 | Goodermuth et al. |
| 8,654,636 B2 | 2/2014 | Conway et al. |
| 8,798,821 B2 | 8/2014 | Kraeling et al. |
| 8,935,022 B2 | 1/2015 | Cooper et al. |
| 9,120,490 B2 | 9/2015 | Kraeling |
| 2003/0213875 A1* | 11/2003 | Hess, Jr. ................. B61C 17/12 246/167 R |
| 2012/0136515 A1 | 5/2012 | Noffsinger |
| 2014/0252174 A1* | 9/2014 | Melas ..................... B61C 17/12 246/187 A |

* cited by examiner

*Primary Examiner* — Eric Myers
(74) *Attorney, Agent, or Firm* — GE Global Patent Operation; John A. Kramer

(57) ABSTRACT

A communication device includes an analog connector onboard a vehicle in a vehicle system that is coupled with a multiple unit (MU) cable extending through the vehicle system for communication of analog control signals. The device includes a network connector disposed onboard the first vehicle to communicatively couple with a digital communication network of the vehicle system that is separate from the MU cable. The device also includes a relay to close and conductively couple the control system of the first vehicle with the MU cable and to open to decouple a portion of the MU cable disposed onboard the first vehicle with a remainder of the MU cable that is off-board the first vehicle.

17 Claims, 6 Drawing Sheets

VEHICLE CONSIST CONFIGURATION CONTROL

FIELD

Aspects of the inventive subject matter described herein generally relate to communications between propulsion-generating vehicles and, more particularly, to communication between propulsion-generating vehicles in a vehicle system (also referred to herein as a vehicle consist). Aspects of the inventive subject matter also relate to data communications, such as data communications in a vehicle system.

BACKGROUND

A vehicle or locomotive "consist" or system is a group of two or more vehicles (e.g., locomotives) that are mechanically coupled or linked together to travel along a route. Trains may have one or more locomotive consists. The vehicles can be interconnected electrically by multiple unit ("MU") trainlines or MU cables so that an operator in one vehicle can remotely control operation of the other vehicles. For example, freight trains are often hauled by multiple locomotive ensembles ("consists") placed together at the front or rear of the train or dispersed among the freight cars. A single crew at the front of the train coordinates all of the locomotive throttles and brake commands via a connection called the multiple unit line ("MU-line") that runs among the locomotives. Another example is, if the front, or lead, locomotive is in dynamic braking operation at a specified brake level (controlled by an operator request), then all of the locomotives in the consist are also operating in dynamic braking operation at the same specified level. As such, it should be appreciated that there may be multiple consists in a train and that these consists may be set up such that all of the locomotives in each consist act in unison.

The currently known MU cables include a 27-pin cable that electrically (e.g., conductively) couples vehicles together to allow a single lead vehicle to command throttle settings and dynamic brake settings to multiple trailing vehicles in the same vehicle system. This system has several inherent advantages in that it is robust and simple, but also has several inherent drawbacks. The MU cable is a conductive pathway extending along the length of the vehicle system. The MU cable may not provide vehicle-to-vehicle isolation and, as a result, an electrical fault (e.g., a ground fault or wiring error) within one vehicle is experienced by all other vehicles connected to the MU cable. For example, if a first vehicle experiences a ground fault, then all other vehicles connected to the same MU cable may experience the same ground fault, even if only the first vehicle is the source of the ground fault.

Additionally, there may not be any ability to identify the source of signals or faults along the MU cable. If a first vehicle experiences a ground fault, then all other vehicles experience the same ground fault and, as a result, the location of the ground fault may not be able to be easily determined. The feedback that can be provided (via signals communicated along the MU cable) from the remote vehicles may be limited in that only a single line of the cable may be available for this feedback.

BRIEF DESCRIPTION

In one embodiment of the inventive subject matter described herein, a communication device includes an analog connector configured to be disposed onboard a first vehicle of plural vehicles in a vehicle system and to conductively couple with a multiple unit (MU) cable that extends through and conductively couples the vehicles for communication of analog control signals among control systems of the vehicles via the MU cable. The device also includes a network connector configured to be disposed onboard the first vehicle to communicatively couple with a digital communication network of the vehicle system that is separate from the MU cable. The device also includes a relay configured to be disposed onboard the first vehicle to close and conductively couple the control system of the first vehicle with the MU cable. The relay also can be configured to open to decouple a portion of the MU cable disposed onboard the first vehicle with a remainder of the MU cable that is off-board the first vehicle. The relay can be configured to close to communicate the analog control signals between the control systems of the vehicles via the MU cable during a time period that the relay is closed and isolate the portion of the MU cable that is onboard the first vehicle from the remainder of the MU cable during a different time period that the relay is opened.

In one embodiment, a communication system includes a first communication device configured to be disposed onboard a first vehicle of plural vehicles in a vehicle system and a second communication device configured to be disposed onboard a second vehicle of the vehicles in the vehicle system. Each of the first and second communication devices can include analog connectors configured to be conductively coupled with a multiple unit (MU) cable that extends through and conductively couples the vehicles of the vehicle system for communication of analog control signals among control systems of the vehicles via the MU cable. At least one of the first or second communication devices including a network connector configured to be disposed onboard the first vehicle to communicatively couple with a digital communication network of the vehicle system that is separate from the MU cable. At least one of the first or second communication devices includes a relay configured to close and conductively couple the control system of the first vehicle with the MU cable and to open to decouple a portion of the MU cable disposed onboard the first vehicle between the first and second communication devices with a remainder of the MU cable that is off-board the first vehicle. The relay can be configured to close to communicate the analog control signals between the control systems of the vehicles via the MU cable during a time period that the relay is closed and isolate the portion of the MU cable that is onboard the first vehicle from the remainder of the MU cable during a different time period that the relay is opened.

In one embodiment, a method (e.g., for communicating between vehicles) includes, responsive to activation of a communication device onboard a first vehicle of plural vehicles in a vehicle system having a multiple unit (MU) cable extending through and conductively coupling the vehicles, opening a relay onboard the first vehicle to disconnect at least a portion of the MU cable onboard the first vehicle from a remainder of the MU cable disposed off-board the first vehicle, receiving an analog control signal communicated via the MU cable at the first vehicle, and communicating the analog control signal to a control system of the first vehicle as a digital control signal in order to remotely control movement of the first vehicle from another vehicle in the vehicle system.

In one embodiment, a communication device for a first vehicle includes an analog connector configured to be disposed onboard the first vehicle and to conductively couple with a cable bus that extends through the first vehicle. The communication device is configured to conductively couple the first vehicle with one or more other vehicles of a vehicle system, for communication of at least analog control signals among control systems of the vehicles via the cable bus. The device also can include a network connector configured to be disposed onboard the first vehicle to communicatively couple with a digital communication network of the vehicle system that is separate from the cable bus. The device can include a relay configured to be disposed onboard the first vehicle and operable to a closed state and an open state. In the open state, the relay electrically disconnects a first portion of the cable bus from a second portion of the cable bus. In the closed state, the relay electrically connects the first portion of the cable bus to the second portion.

In one embodiment, a communication device includes a cable bus disposed onboard a first vehicle and connected to at least one externally accessible analog connector to conductively couple the first vehicle with one or more other vehicles of a vehicle system, for communication of at least analog control signals between the vehicles via the cable bus. The device can include a network bus disposed on board the first vehicle and connected to at least one network connector to conductively couple the first vehicle with the one or more other vehicles of the vehicle system, for communication of network data between the vehicles via the network bus. The device can include a relay electrically connected to the cable bus and operable to establish, in a first mode of operation, an electrical connection between portions of the cable bus on either side of the relay, and in a second mode of operation, an open circuit condition between the portions of the cable bus.

BRIEF DESCRIPTION OF THE FIGURES

The foregoing and other features and advantages of the inventive subject matter will be more fully understood from the following detailed description of illustrative embodiments, taken in conjunction with the accompanying drawings in which like elements are numbered alike in the several Figures.

DETAILED DESCRIPTION

Although example embodiments of the inventive subject matter are described with respect to trains, locomotives, and other rail vehicles, embodiments of the inventive subject matter also are applicable for use with vehicles generally, such as off-highway vehicles (e.g., vehicles that are not designed and/or permitted to travel on public roadways), agricultural vehicles, and/or transportation vehicles, each of which may include a vehicle consist. As noted above, a vehicle consist is a group of locomotives or other vehicles that are mechanically coupled or linked together to travel along a route, with each vehicle in the consist being adjacent to one or more other vehicles in the consist.

Figure 1:
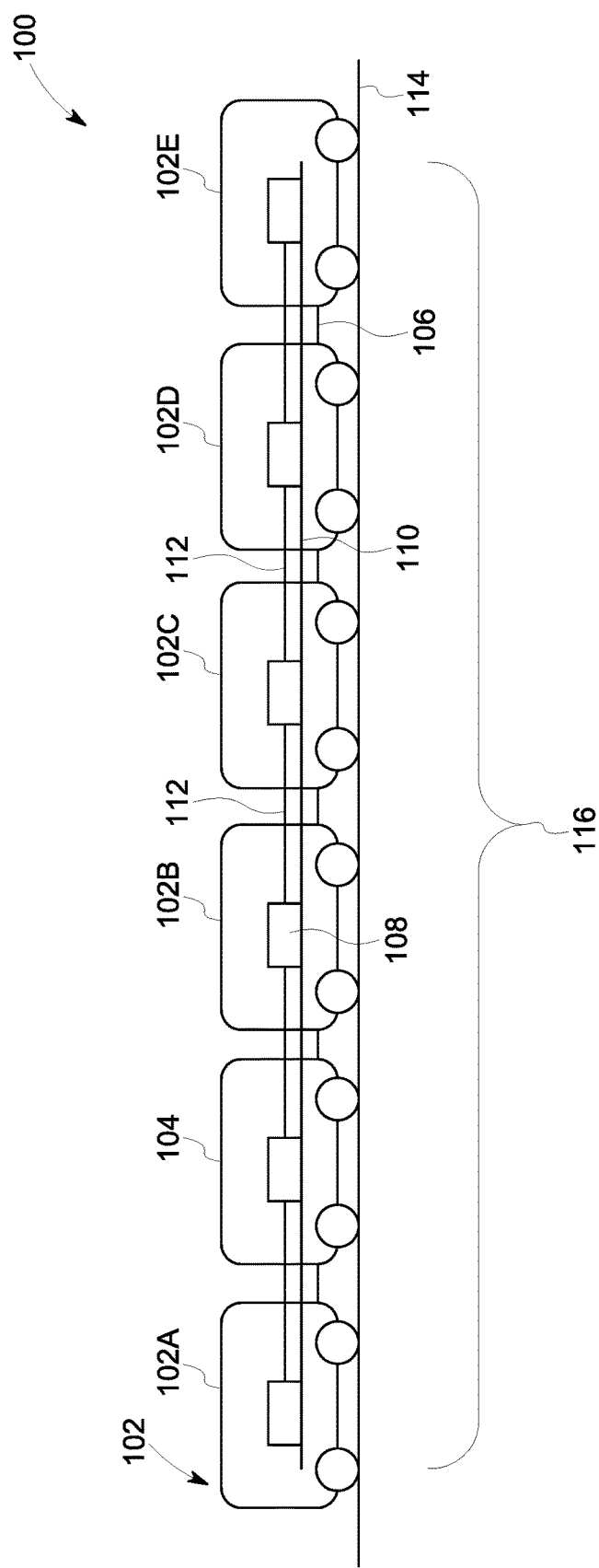
FIG. 1 illustrates a vehicle system according to one embodiment.

FIG. 1 illustrates a vehicle system 100 according to one embodiment. The vehicle system 100 includes several vehicles 102, 104 that travel together along a route 114. The vehicles 102, 104 may include propulsion-generating vehicles 102 (vehicles 102A-E) and/or non-propulsion-generating vehicles 104. The number and/or arrangement of the vehicles 102, 104 shown in FIG. 1 is provided merely as one example, and is not limiting on all embodiments of the inventive subject matter described herein.

The vehicle system 100 may represent a train or rail vehicle consist, or may represent other types of vehicle systems. The vehicles 102 may represent locomotives and the vehicle 104 may represent rail cars or passenger cars. Alternatively, the vehicle system 100 may represent another type of vehicle system, with the vehicles 102, 104 representing other types of vehicles. For example, the vehicles may represent automobiles, off-highway vehicles other than rail vehicles (for example, vehicles that are not designed and/or legally permitted to travel on public roadways), mining vehicles, or the like. The vehicles 102, 104 may be mechanically coupled with each other, such as by couplers 106 disposed between adjacent vehicles 102 and/or 104.

The vehicles 102 and/or 104 may include control systems 108 disposed onboard the respective vehicles 102, 104. With respect to the propulsion-generating vehicles 102, the control systems 108 may represent hardware circuitry that includes and/or is connected with one or more processors (for example microprocessors, controllers, field programmable gate arrays, integrated circuits, application specific integrated circuits, or other electronic logic-based devices) that communicate with the propulsion systems and/or braking systems disposed onboard the vehicles 102 to control movement of the vehicles 102. Such propulsion systems can include engines, traction motors, or the like, in the braking systems may include air brakes, dynamic brakes, disc brakes, or the like. With respect the vehicles 104, the control systems 108 reps in hardware circuitry that includes and/or is connected with one or more processors (for example, microprocessors, controller, field programmable gate arrays, integrated circuits, application specific integrated circuits, or other electronic logic-based devices) that communicate with the propulsion systems, braking systems, or other systems disposed onboard the vehicles 104 to control movement of the vehicles 104.

The vehicle system 100 includes a non-network communication pathway 110 that extends through and conductively couples control systems 108 of some or all of the vehicles 102, 104 in the vehicle system 100. In one embodiment, the pathway 110 is an MU cable, although not all embodiments disclosed herein are limited to an MU cable. Non-network, analog control signals can be communicated between the control systems 108 via the MU cable 110, such as by communicating voltage signals (e.g., 74 volts of direct current or another value) along the cable 110. In one embodiment, the non-network control signals can include network data that is modulated into the analog signal. The network data can be converted into modulated network data for transmission over the MU cable 110. "Network data" refers to data that is packaged in packet form, meaning a data packet that comprises a set of associated data bits. Each data packet may include a data field and a network address or other address uniquely associated with a computer unit or other electronic component in the vehicle system. The MU cable 110 may be used in the vehicle system for transferring non-network control information between the vehicles 102 in the vehicle system. "Non-network" control information refers to data or other information, used in the vehicle system for control purposes, which is not packet data. In one aspect, the non-network control information can be communicated as analog signals, such as analog voltage signals that propagate along the entire length of the MU cable 110. For example, a change in voltage applied to the MU cable 110 can instruct the remote vehicles 102B-E to change to a designated throttle setting. But, such an applied voltage may not be able to instruct individual vehicles 102B-E to have different throttle settings than other vehicles 102B-E.

In one aspect, the pathway or MU cable 110 conducts non-network signals in that the pathway or cable 110 conducts signals that are received by and acted upon all control systems 108 along the length of the vehicle system. For example, a non-network control signal communicated along the MU cable 110 may direct all remote vehicles to implement a change in operational settings, without the control signal being addressed to an individual remote vehicle. A network control signal, however, may be communicated along pathways other than the MU cable 110 and be addressed to one or more individual remote vehicles so that the operational settings of only those addressed remote vehicles are changed according to the network control signal.

The vehicle system 100 includes a communication system 116 that includes the control systems 108 disposed on two or more of the vehicles 102, at least part of the pathway 110, and/or one or more network connections 112. This communication system 116 also may include communication devices 200, 400 (shown in FIGS. 2 through 5) that provide the ability for control systems 108 to communicate analog, non-network control signals along the pathway 110, to digitally communicate digital, network control signals between via one or more networks formed by the network connections and the communication devices, and/or electrically isolate the communication components of the control systems 108 disposed onboard the different vehicles 102 from each other.

Two or more of the control systems 108 onboard the different vehicles 102 in the vehicle system 100 may be communicatively coupled by the network connection 112. The network connection 112 can represent one or more cables or other conductive bodies that interconnect plural control systems 108 in a digital communication network. As one example, the connection 112 can represent an Ethernet cable or connection between control systems 108. Not all of the control systems 108 onboard the vehicle system 100 may include network connectors and, as a result, less than all of the control systems 108 may be connected to the network by network connections 112. Alternatively, all of the control systems 108 may be connected by network connections 112. In one embodiment, a network connection 112 extends along the entire length of the vehicle system and connects two or more (or all) of the control systems 108. For example, an Ethernet cable or other type of communication cable may extend along the length of the vehicle system, with two or more of the control systems 108 connected with the cable (and, optionally, one or more of the control systems 108 not connected with the cable).

The network formed the network connections 112 in the control systems 108 that are interconnected by the network connections 112 may differ from the control systems 108 that are only connected with each other via the MU cable 110 in that the network that is formed can allow for individual addressing of control signals to different control systems 108. For example, within the network, a control signal may be addressed to an individual control system 108, two or more, but less than all, control systems 108 in the network, or to all control systems 108. The control signals may then be communicated to and received by the control systems 108 that are addressed by the control signals, but may not be received or may not be acted upon by the control systems 108 that are not addressed by the control signal. In contrast, and as described above, a control signal communicated along the MU cable 110 is communicated to all control systems 108 without the ability to individually address control signals to individual control systems 108.

As shown in FIG. 1, not all of the control systems 108 are connected with each other in the network by network connections 112. For example, the control systems 108 onboard the vehicles 102A, 102E are not connected with each other or other control systems 108 by network connections 112. These control systems may only be communicatively coupled with each other by the cable 110. The control systems 108 onboard the vehicles 102B, 102C, 102D, however, are interconnected with each other in the network by the network connections 112. The control systems 108 onboard the vehicles 102A, 102E may not have the components or capability of connecting with other control systems in a network. These types of control systems 108 may be referred to as legacy control systems. The control systems 108 that are able or have the components to connect with each other in the network (the control systems 108 onboard the vehicles 102B, 102C, 102D) may be referred to as updated or MU-updated control systems 108.

In one embodiment, the communication system 116 can include digital network connectors 204 (shown in FIG. 2) disposed on opposite ends of one or more of the vehicles 102. The network connectors can be connected with network connectors onboard other vehicles 102 via network connections 112 in order to create one or more networks onboard the vehicle system. These network connections may be Ethernet connections with Ethernet connectors disposed on opposite ends of the vehicles 102. The communication system 116 may be installed on new or retrofitted vehicles 102 and can read and repeat the analog signals communicated along the MU cable 110 (for example, the 74 V analog control signals), but also isolate the control systems 108 onboard the vehicles 102 from each other. The communication system 116 can provide network connections (for example, Ethernet connections) for true digital network communication capability.

The communication system 116 can operate such that, when the portion of the system 116 that is disposed onboard a first vehicle 102 is unpowered, the signals communicated along the MU cable 110 pass through the portion of the communication system 116 that is disposed onboard the first vehicle 102, but when the portion of the communication system 116 disposed onboard the first vehicle is powered, this portion isolates the network connectors on opposite ends of the first vehicle 102 from each other and from the control system 108 onboard the first vehicle 102. The communication system 116 can provide the control system 108 of a first vehicle 102 with the control signals communicated along the MU cable 110 in either a digital (for example, Ethernet) format and/or an analog voltage signals (for example, 74 V direct current control signals). Moreover, the communication system 116 can host a network device (an Ethernet over MU cable 110 device) that communicates network data over the MU cable 110.

Figure 2:
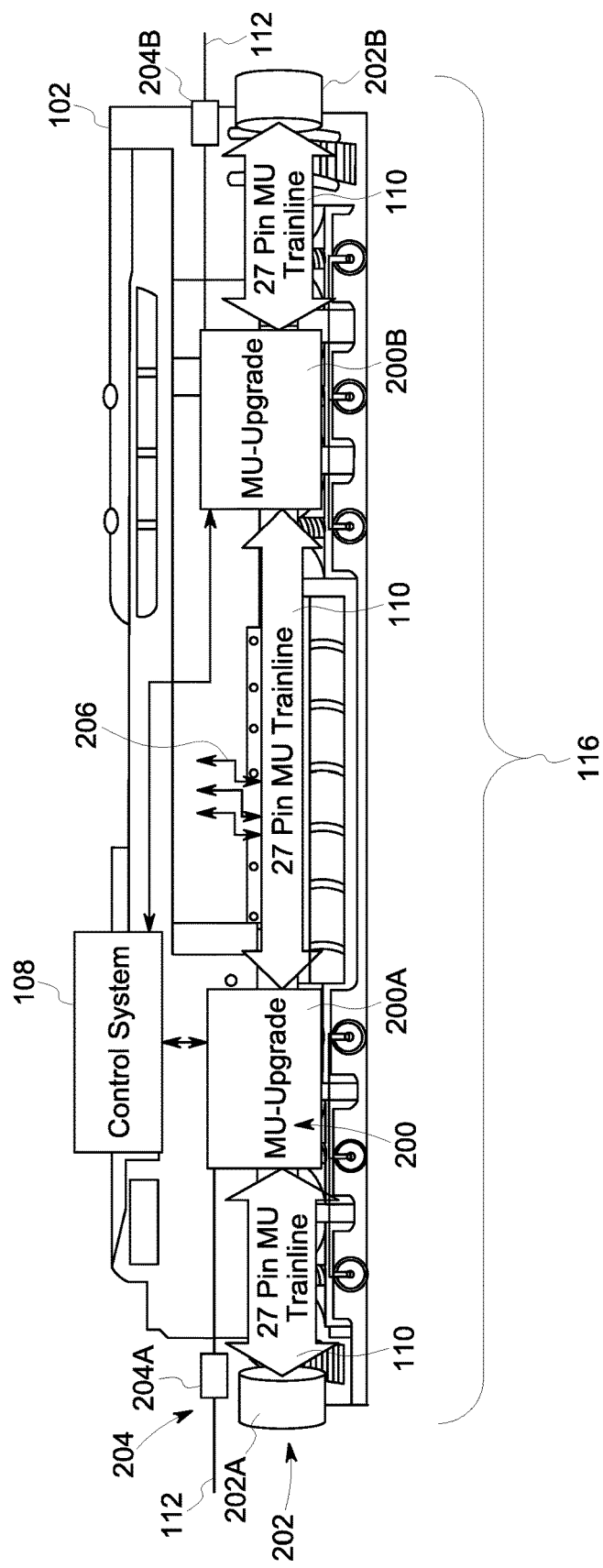
FIG. 2 illustrates a portion of a communication system shown in FIG. 1 that is disposed onboard a vehicle according to one embodiment.

FIG. 2 illustrates a portion of the communication system 116 shown in FIG. 1 that is disposed onboard a vehicle 102 according to one embodiment. The control system 108 is communicatively coupled with communication devices 200 (communication devices 200A, 200B in FIG. 2). The control system 108 may be communicatively coupled with the communication devices 200 by one or more wired pathways or other conductive pathways. As shown in FIG. 2, the communication devices 200 alternatively may be referred to as MU-upgrade devices 200. The communication system 116 may include non-network, or MU, connectors 202 (for example, connectors 202A, 202B) disposed on opposite ends of the vehicle 102. The connectors 202 may couple with portions of MU cable 110 (shown in FIG. 1) that are disposed outside of the vehicle 102. Additional portions of the cable 110 may extend between the connectors 202 and the communication devices 200, as shown in FIG. 2. For example, a first portion of the MU cable 110 can extend from a leading end connector 202A to the communication device 200A, a second portion of the MU cable 110 may extend from the communication device 200A to the other communication device 200B, and a third portion of the MU cable 110 may extend from the communication device 200B to the rear or trailing end connector 202B. Control signals that are communicated along the MU cable 110 from another vehicle 102 may propagate along the MU cable 110 and through one or more portions of the MU cable 110 disposed onboard the vehicle 102 via the connector 202A and/or 202B. The communication devices 200 may operate to allow the signals to propagate along and through the portions of the MU cable 110 that is disposed onboard the vehicle 102 to one or more other vehicles 102 in the same vehicle system 100 (shown in FIG. 1).

In one aspect, the portion of the MU cable 110 that is disposed onboard the vehicle 102 between the communication devices 200A, 200B may be communicatively coupled with one or board onboard components (not shown) of the vehicle 102 by one or more connections 206. These connections 206 can connect the MU cable 110 with components such as an onboard display, a throttle, a brake handle, an alarm, or the like. Control signals communicated to or from these components may propagate along the MU cable 110 to and/or from one or more other vehicles 102.

The communication devices 200 also are communicatively coupled with digital network connectors 204 (for example, network connectors 204A, 204B in FIG. 2). The network connectors 204 may represent connectors that can coupled with the network connections 112 shown in FIG. 1, such as Ethernet connectors. The network connectors 204 and network connections 112 can establish a network that interconnects two or more control systems 108 onboard different vehicles 102. The control system 108 onboard a vehicle 102 may be communicatively coupled with the communication devices 200 of the vehicle 102 and one or more wired and/or wireless connections to allow the control system 108 to be connected with the network that includes the connectors 204 and network connections 112.

Figure 3:
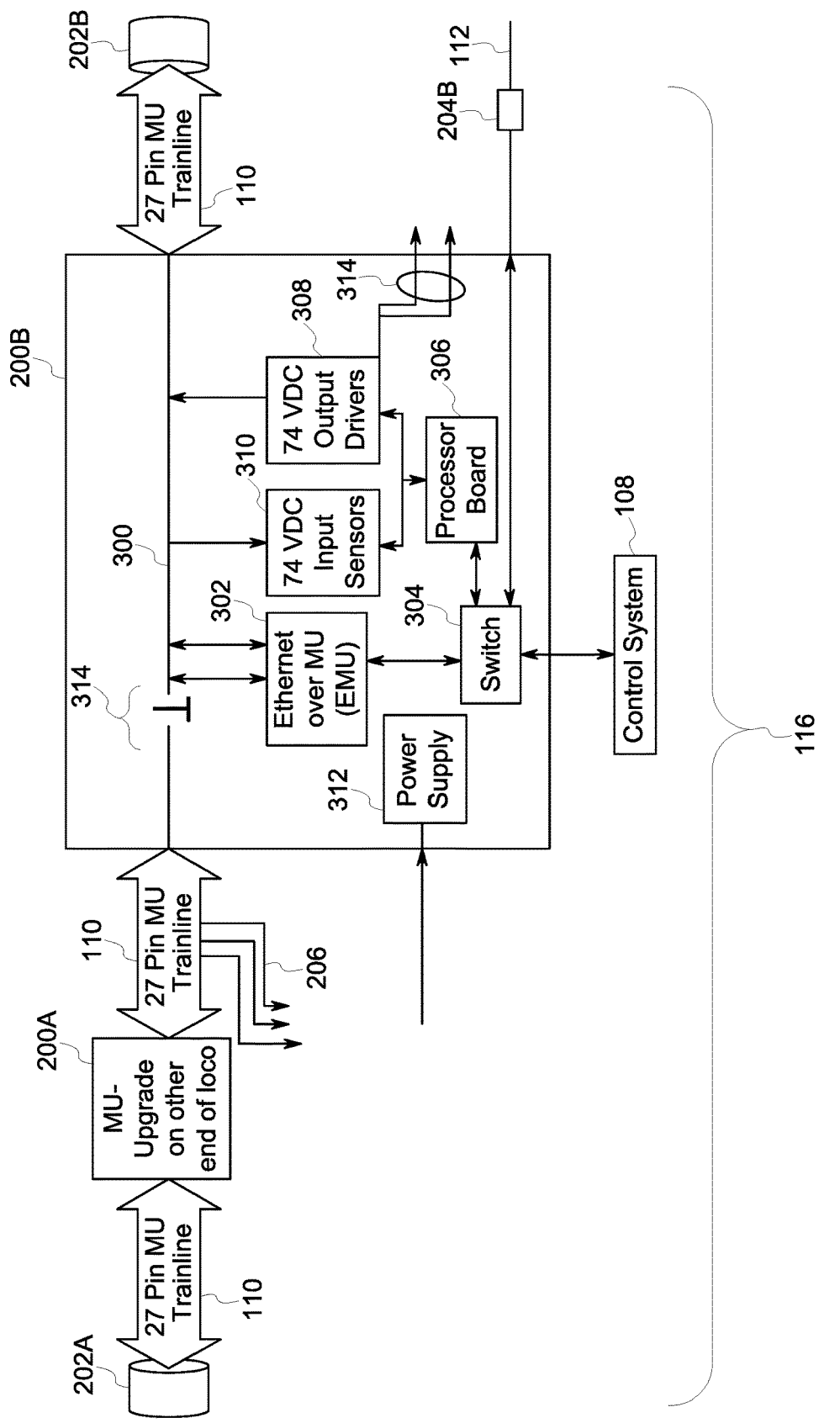
FIG. 3 illustrates another view of the portion of the communication system shown in FIG. 1 disposed onboard one of the vehicles shown in FIG. 1 according to one embodiment.

FIG. 3 illustrates another view of the portion of the communication system 116 disposed onboard one of the vehicles 102 according to one embodiment. FIG. 3 illustrates additional details of the communication device 200B. The description of the components shown in FIG. 3 also may apply to the other communication device 200A disposed onboard the same vehicle 102. For example, the illustration of the communication device 200B may also represent the communication device 200A, with differences being that the communication device 200B is connected to connectors 202B, 204B while the communication device 200A is connected with the connectors 202A and 204A.

The communication device 200B includes non-network communication pathway 300 that interconnects portions of the cable 110 disposed onboard the vehicle 102 on opposite sides of the communication device 200B. For example, the pathway 300 can represent one or more wired connections (for example cables, wires, buses, or the like) that interconnects and communicates signals received from the portion of MU cable 110 extending between the communication device 200B and the connector 202B and/or received from the portion of the MU cable 110 extending between the communication devices 200A, 200B on the same vehicle 102.

The communication device 200B also includes network transceiving circuitry 302 (Ethernet over MU in FIG. 3) communicatively coupled with the pathway 300. The circuitry 302 may be connected with the pathway 300 to receive and/or send control signals along the MU cables 110 via the pathway 300. In one aspect, the circuitry 302 can receive analog control signals that are modulated with network data for communication as Ethernet over MU, or eMU, signals along the MU cable 110. The circuitry 302 can convert network data into modulated network data for communication over the MU cable 110 between the vehicles 102. The modulated network data may be orthogonal to non-network control information or signals communicated between the vehicles 102 via the MU cable 110 to avoid interference. At the vehicles 102 that receive modulated network data, the circuitry 302 can demodulate the data for use by components disposed onboard the vehicle 102, such as the control system 108. The circuitry can include or represent one or more router transceiver units. The term modulated can include data converted from one form to a second, different form that is suitable for communication over the MU cable 110. For example, prior to modulating some control signals, the data forming the control signals may not be suitable for communication via the MU cable 110. After modulating the digital network data into a form suitable for vacation over the mu cable 110 (for example, analog signals) the data representing the control signal may be communicated via the MU cable 110. The term demodulate can include the operation of converting data from the second form back to the first form.

The circuitry 302 can include a router transceiver unit having a network adapter and a signal modulator. The signal modulator can be electrically connected to the network adapter and to the MU cable 110. The signal modulator can be electrically connected to the MU cable 110 by way of a central terminal board. The network adapter can be electrically connected to a network interface unit that is part of and/or operably connected to an electronic component of the vehicle 102, such as the control system 108. The network adapter and network interface unit can be electrically interconnected by a network cable. If the network adapter and network interface unit are configured as an Ethernet local area network, the network cable may be a CAT-5E cable (and the network connections 112 may be CAT-5E cables). The network adapter can receive network data from the network interface unit over the network cable. The network adapter conveys the network data to the signal modulator, which modulates the network data into modulated network data and transmits the modulated network data over the MU cable 110. The signal modulator also receives modulated network data from over the MU cable 110 and de-modulates the modulated network data into network data 16, which it then conveys to the network adapter for transmission to the network interface unit. One or both of the network adapter module and the signal modulator may perform various processing steps on the network data and/or the modulated network data for transmission and reception both over the MU cable 110 and/or over the network cable (to the network interface unit). Additionally, one both of the network adapter and the signal modulator may perform network data routing functions.

The circuitry 302 is operably connected with a switch 304. The circuitry 302 may be connected with the switch 304 by one or more wired connections. The switch 304 may in turn be connected with one or more processors 306 (a "processor board" in FIG. 3) to the connector 204B, and the control system 108. The switch can alternate between states to couple and/or decouple two or more of the circuitry 302, the one or more processors 306, the network connector 204B, and/or the control system 108. The processors 306 can represent one or more electronic logic-based devices, such as one or more processors, microprocessors, field programmable gate arrays, integrated circuits, application specific integrated circuits, or other electronic logic-based devices. The processors 306 perform operations of the communication system 116 and/or communication device 200, as described herein.

The processors 306 are operably connected with one or more output drivers 308 and one or more input sensors 310. The output drivers 308 are operably coupled with the pathway 300 so that the output drivers 308 can generate and apply an analog signal, such as an analog voltage signal, to the pathway 300 for communication along the MU cable 110 to one or more other vehicles 102. In one aspect, the output drivers 308 can represent 74 volt direct current output drivers that can generate a signal having a 74 volt direct current on the pathway 300 for communication along the MU cable 110.

The input sensors 310 represent one or more sensors that can sense an analog voltage signal conducted along the pathway 300 from the MU cable 110. For example, the input sensors 310 can detect whether or not a 74 volt direct current signal (or other type a signal) is conducted along the pathway 300 from the MU cable 110 (e.g., from another vehicle 102). The input sensors 310 can represent one or more voltage-sensitive devices, such as a voltmeter or other device. Based on detection of the analog control signals communicated along the pathway 300, the processors 306 can determine whether not a control signal is being communicated from another vehicle 102. In response to determining that such a signal is being communicated from another vehicle 102, the processors 306 can communicate the signal and/or generate other signals (for example, a digital signal representative of the analog signal) to the control system 108 via the switch 304 for implementation by the control system 108. For example, if an analog signal communicated along the MU cable 110 from another vehicle 102 instructs the control system 108 to change a throttle setting, then the processors 306 can detect the signal via the input sensors 310, and instruct the control system 108 to change the throttle setting of the vehicle 102 accordingly.

With respect to the output drivers 308, the processors 306 can direct the output drivers 308 to generate and apply voltage to the pathway 300 to create an analog voltage control signal for conduction along the MU cable 110 to one or more other vehicles 102. For example, the control system 108 may be used by an operator or other system to remotely change a throttle brake setting of another vehicle 102. The control system 108 may generate a signal that is communicated to the processors 306 via the switch 304 to implement this remote control. Responsive to receiving the signal from the control system 108, the processors 306 can direct the output drivers 308 to apply an appropriate and representative analog signal to the pathway 300 for conduction along the MU cable 110 as an analog voltage control signal to the vehicles 102 that are being remotely controlled. In one aspect, the output drivers 308 optionally may be connected by one or more communication pathways 314 (e.g., wires, cables, or the like) with other components onboard the vehicle 102 for alarm functions and the like. For example, a sensor, input device, or the like onboard the vehicle 102 may be used to generate alarm signal. Responsive to generation of the alarm signal, the output drivers 308 may generate a corresponding analog voltage signal on the pathway 300 for conduction along the MU cable 110 to one or more other vehicles 102.

The switch 304 also can be connected to the network connector 204B. This connection can allow for the control system 108 to communicate digital network signals to one or more other vehicles 102 via the network connector 204B and the network connections 112 shown in FIG. 1. For example, if the communication device 200B is communicatively coupled with another communication device disposed onboard another vehicle 102 by a network connection 112, then the control system 108 can communicate (send and/or receive) network control signals via the switch 304, the network connector 204, and the network connection 112. The network formed from the communication devices and network connections may allow for data packets, such as Internet protocol data packets, to be individually addressed to individual or different communication devices within the network. This is in contrast the communication of control signals along the MU cable 110, which would be communicated to all vehicles 102 and/or control systems 108 connected with MU cable 110.

A power supply 312 can be coupled with one or more power sources (not shown in FIG. 3) to power one or more components of the communication device 200. For example, the power supply 312 can a connector that connects with one or more batteries, alternators, generators, or the like, and and/or may represent a battery of the communication device 200. The power supply 312 can supply voltage and/or current to one or more of the components of the communication device 200 shown in FIG. 3.

The communication device 200 includes a relay 314. The relay 314 can represent one or more switches, contactors, or the like, that are controlled to allow or prevent non-network signals from being communicated along the MU cable 110 extending through the vehicle (such as the portion of the MU cable 110 extending for the communication device 200A to the communication device 200B). As shown in FIG. 3, the communication system 116 can include two of the communication devices 200 disposed on opposite ends of a vehicle 102. During time periods that the communication devices 200 on the vehicle 102 are on (for example, powered via the power supplies 312), the relays 314 in one or both of the communication devices 200 can open to interrupt a connection between the MU cable 110 and the control system 108. This interruption can prevent electric signals, such as analog or non-network control signals, to be conveyed between the communication devices 200 along the portion of MU cable 110 that extends between the communication devices 200A, 200 B onboard the same vehicle 102. As a result, one or both of the communication device 200 receives the non-network signal, but the signal will not be conducted between the communication devices 200 along the portion of the MU cable 110 that extends between the communication devices 200. Instead, the non-network signal can be detected by the circuitry 302 and/or the input sensors 310 and communicated to the control system 108 for implementation by the control system 108. Optionally, such a signal may be detected and/or processed by the circuitry 302 and communicated to the processors 306 via the switch 304. The processors 306 can convey the signal to one or more other components of the vehicle 102 and/or generate another non-network signal for communication along MU cable 110 via the output drivers 308.

During time periods that the communication devices 200 are deactivated or turned off, the relays 314 can close such that the communication devices 200 are communicatively coupled with each other by the portion of MU cable 110 extending between the communication devices 200 onboard the same vehicle 102. As a result, a signal received by a connector 202 along the MU cable 110 from outside of the vehicle 102 will be conducted and conveyed along the portions of MU cable 110 onboard the vehicle 102 between the communication devices 200. This can allow for these control signals to propagate along the length of MU cable 110 and to other vehicles 102 in the vehicle system. This can be useful in instances where control signals are being communicated along MU cable 110 to vehicles 102 that may not include the communication device 200 and/or otherwise are receiving control signals along the MU cable 110.

Figure 4:
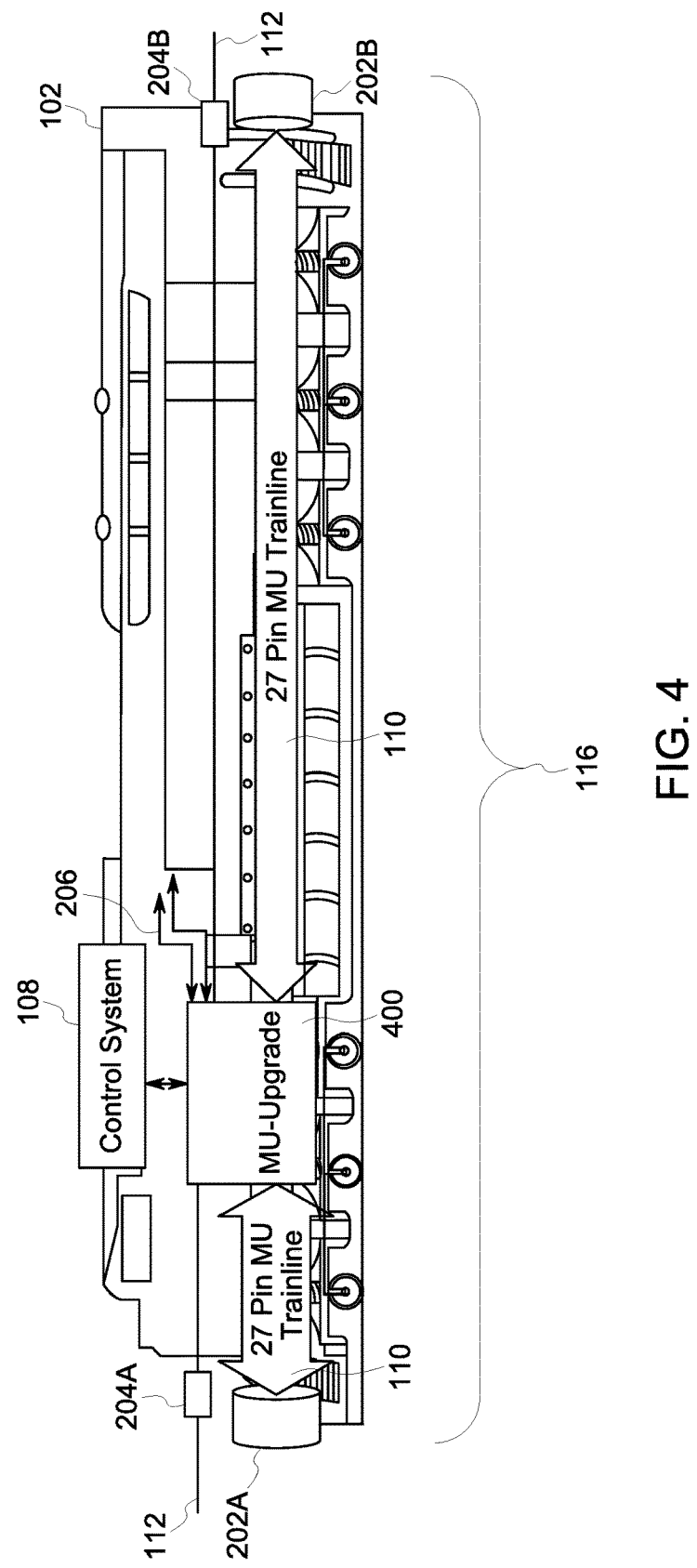
FIG. 4 illustrates a portion of the communication system shown in FIG. 1 disposed onboard a vehicle according to one embodiment.

FIG. 4 illustrates a portion of the communication system 116 disposed onboard a vehicle 102 according to one embodiment. In contrast to the portion of the communication system 116 shown in FIGS. 2 and 3, the portion of the communication system 116 disposed onboard the vehicle 102 shown in FIG. 4 may include a single communication device 400. Alternatively, the vehicle 102 can include two or more of the communication devices 400 shown in FIG. 4. The communication device 400 may be connected with portions of MU cable 110 disposed onboard the vehicle 102 between the MU connector 202A and the communication device 400, and between the connector 202B and the communication device 400. The communication device 400 also may be connected with the network connectors 204A, 204B for connection with one or more networks formed by the communication device 400 and one or more other communication devices 200 and/or 400 described herein. The communication device 400 optionally may be connected with one or more additional components by communication pathways 206 (e.g., wires, cables, etc.).

In operation, non-network signals that are communicated along the MU cable 110 and received via the connector 202A or 202B are communicated to the communication device 400 along the respective portion of MU cable 110 disposed onboard the vehicle 102 shown in FIG. 4. The communication device 400 may receive and/or process the non-network signals for implementation by the control system 108 and/or one or more other devices or components disposed onboard the vehicle 102. Optionally, the communication device 400 can receive digital network signals via the network connector 204A, 204B. The communication device 400 may communicate the signals to control system 108 and/or one or more other components disposed onboard the vehicle 102. In one embodiment, the communication device 400 may receive analog, non-network signals along the MU cable 110 and convert the non-network signals to digital network signals that are communicated through the network of the communication devices via the network connectors 204 and network connections 112 shown in FIG. 1.

Figure 5:
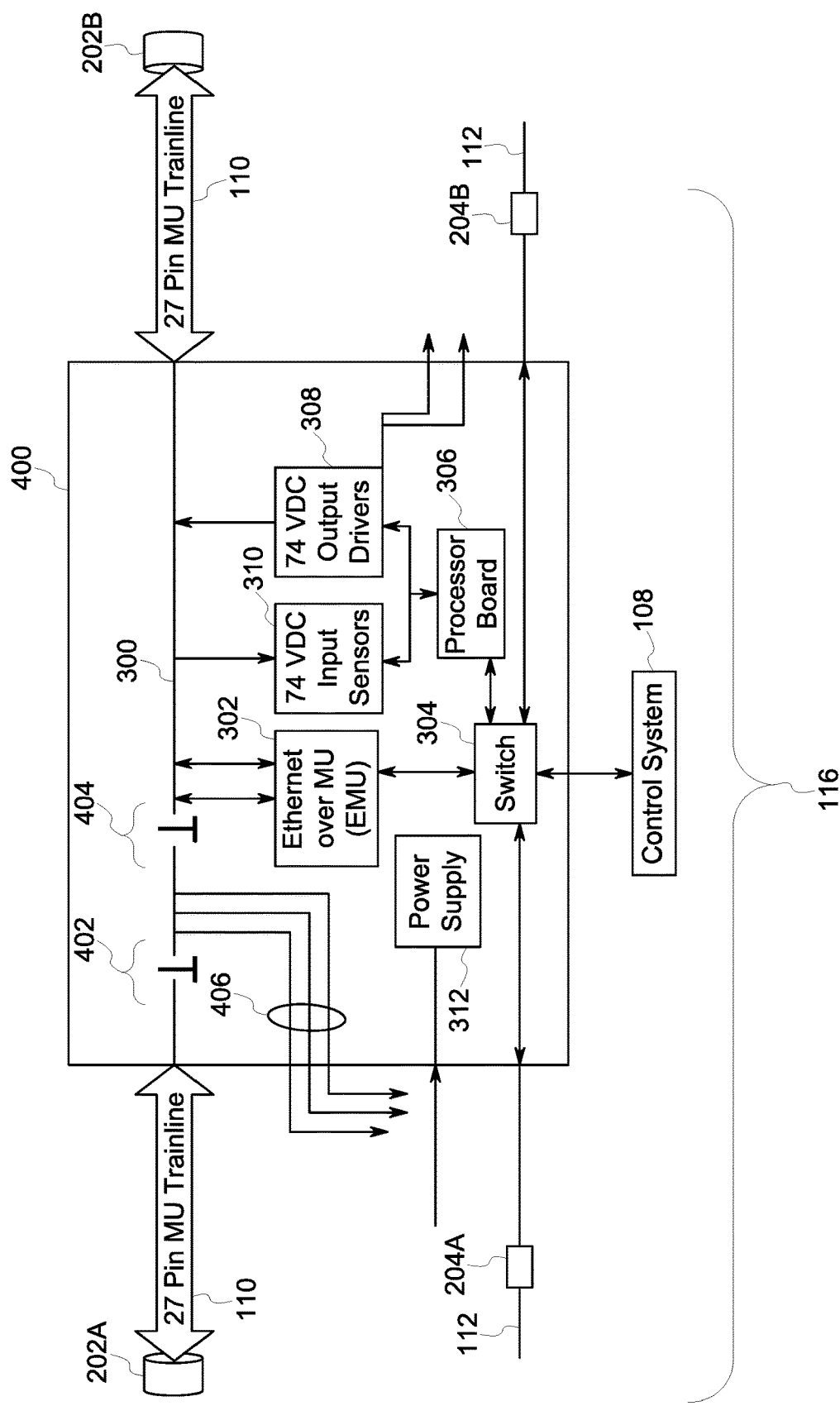
FIG. 5 illustrates a communication device shown in FIG. 4 according to one embodiment.

FIG. 5 illustrates the communication device 400 shown in FIG. 4 according to one embodiment. Similar to the communication device 200 shown in FIG. 3, the communication device 400 is connected with MU connectors 202 by portions of the MU cable 110 disposed onboard the vehicle 102. The communication device 400 also is connected with the network connectors 204. In contrast the communication device 200 that is connected only one of the network connectors 204B, the communication device 400 is connected to both the network connectors 204A, 204 B in the illustrated embodiment.

The communication device 400 includes the input sensor 310, the output driver 308, the one or more processors 306, the switch 304, the circuitry 302, and the power supply 312 described above. The communication device 400 also includes relays 402, 404. Each of the relays 402, 404 may be the same as the relay 314 shown in FIG. 3, or one or more of the relays 402, 404 may be a different relay than the relay 314 shown in FIG. 3. The communication device 400 optionally may include several communication pathways 406 to components onboard the vehicle 102, such as alarms, output devices, sensors, or the like. The pathways 406 can represent one or more wired connections between the pathway 300 in the communication device 400 and the components of the vehicle. In the illustrated embodiment, the connections 406 are coupled with the pathway 300 between the relays 402, 404.

In operation, and similar to the communication device 200 shown in FIG. 3, the communication device 400 can communicate non-network signals with one or more other vehicles 102 along MU cable 110 and may communicate network signals with one or more other communication devices onboard other vehicles 102 via the network connections 112 and the network connectors 204. For example, when the communication device 400 is activated, one or both of the relays 402, 404 may be opened such that the connection with the MU cable 110 is interrupted and non-network signals communicated to the communication device 400 along the MU cable 110 do not propagate through the communication device 400 along the pathway 300 from the connector 202A to the connector 202B or from the connector 202B to the connector 202A for propagation to one or more other communication devices 200, 400 onboard one or more other vehicles 102. Instead, a non-network signal that is received by the communication device 400 may be conducted along the pathway 300 and detected by the circuitry 302 and/or the input sensors 310. As described above in connection with communication device 200, this non-network signal may be received, sensed, demodulated, and/or otherwise processed by the circuitry 302 and/or input sensors 310 before being communicated to the control system 108, the one or more processors 306, and/or the drivers 308. With respect to network signals, the signals may be received by communication device 400 via one or more of the connectors 204 and be communicated to one or more of the processors 306 and/or control system 108, as described above.

During time periods that the communication device 400 is inactive or turned off, the relays 402, 404 may be closed so that non-network signals received by the connector 202A or 202B may be communicated along the pathway 300 through the closed relays 402, 404 to one or more onboard components of the vehicle 102 via the pathways 406 and/or along the cable 110 to one or more other vehicles 102, as described above.

The communication devices 200, 400 can allow for isolation of faults or other errors occurring within a control system 108 of the vehicle 102 and/or one or more other components onboard the vehicle 102. For example, if a fault occurs onboard the control system 108 of the vehicle 102 having the control device 200 shown in FIG. 3, the relays 314 on the communication devices 200A, 200B may be opened to prevent the fault (for example, a ground fault) from propagating along the MU cable 110 to one or more other vehicles 102. The processors 306 can open or close the relays 314 in response to the fault occurring. With respect to the communication device 400, the processors 306 can open the relays 402, 404 to prevent a fault of the control system 108 from propagating along MU cable 110 to one or more other vehicles 102. In one aspect, responsive to detecting a fault, one or more processors 306 of the communication devices 200, 400 may communicate a network fault signal via one or more of the network connections 112 to another communication device, or an output device, in order to notify an operator of the vehicle system of the location of the fault, to change operation of the vehicle system (for example, slow or stop movement of the vehicle system), to notify an offboard location of the fault (for example, provide notice to a dispatch facility or scheduling facility in order to automatically schedule repair, inspection, and/or maintenance of the communication system 116 at an upcoming stop), etc.

The communication devices 200, 400 can be installed on new vehicles 102 and/or retrofitted to existing vehicles 102 to allow for reading and repeating non-network signals communicated along an MU cable 110 of a vehicle system (e.g., 74V analog control signals), but also to allow for communicatively and electrically isolating the vehicles 102 from each other. The communication devices 200, 400 provide network connections with each other (e.g., Ethernet connections) for additional digital communications. When the communication devices 200, 400 are unpowered, the non-network signals can pass through the communication devices 200, 400 un-interrupted to other communication devices 200, 400 disposed onboard other vehicles 102 without repeating or otherwise processing the signals. When the communication devices 200, 400 are powered (e.g., turned on), the communication devices 200, 400 can isolate the MU connectors 202A, 202B onboard the same vehicle 102 from each other and the control system 108 onboard the same vehicle 102. Isolating the connectors 202A, 202B can include preventing communication of signals from one connector 202A or 202B to the other connector 202B or 202A. Isolating the connectors 202A, 202B from the control system 108 can include preventing communication of signals from the connectors 202A, 202B to the control system 108 and preventing communication of signals from the control system 108 to the connectors 202A, 202B.

The communication device 200, 400 can communicate the non-network signals received via the MU cable 110 to the control system 108 of the vehicle 102 on which the communication device 200, 400 is located in a digital (network) format, or in an analog (non-network) format. For example, the data represented by a non-network signal received via the MU cable 110 can be obtained by the circuitry 302 and provided to the control system 108 via the switch 304 without changing the signal to a digital format. Or, the data represented by the non-network signal received via the MU cable 110 can be sensed by the input sensors 310 and converted into a digital signal by the processors 306 before communicating the digital signal to the control system 108. The communication devices 200, 400 also may communicate digital network signals via the network connectors 204 and network connections 112.

Some vehicle systems 100 may operate in distributed power (DP) setups, where a lead vehicle 102 remotely controls operations (e.g., throttle settings and/or brake settings) of other vehicles 102 (referred to as remote vehicles 102) in the same vehicle system 100. In one example of operation of such as DP vehicle system 100, the communication devices 200 or communication device 400 onboard the lead vehicle 102 can, upon activation, determine if the communication devices 200 or 400 onboard the lead vehicle 102 are connected with the MU cable 110 in the vehicle system 100 (e.g., via the connectors 202). If such a connection is detected, the communication device 200, 400 can interrupt the connection by opening the relay 314 or relays 402, 404, which thereby isolates the communication device 200, 400 and the control system 108 of the lead vehicle 102 from the MU cable 110.

The control system 108 of the lead vehicle 102 can generate and communicate control signals to the communication device 200, 400 of the lead vehicle 102. The communication device 200, 400 can then apply the control signals as analog, non-network signals to the MU cable 110 (e.g., via the circuitry 302) for communication to the remote vehicles 102 along the MU cable 110. Optionally, the communication device 200, 400 can generate analog control signals based on the control signals from the control system 108 using the processors 306 and the output drivers 308 to communicate the analog signals to the remote vehicles 102 via the MU cable 110. Optionally, the communication device 200, 400 can generate digital control signals based on the control signals from the control system 108 using the processors 306 and communicate the digital signals to the remote vehicles 102 via the network connections 112. The communication device 200, 400 (e.g., the processors 306) also may look for error states, such as voltages on the MU cable 110 that are not being conveyed along the MU cable 110 as control signals, ground faults, etc. The processors 306 may communicate status signals to output devices onboard the lead vehicle 102 and/or other vehicles 102, record (e.g., log) the state of the data in the control signals communicated to remote vehicles 102 by the communication device 200, 400, etc.

Onboard a remote vehicle 102, the communication device 200, 400 can determine if a connection to the MU cable 110 is present via one or more of the connectors 202. If a connection is present, the communication device 200, 400 can interrupt the connection by opening the relay 314, 402, 404, as described above. The communication device 200, 400 can receive non-network control signals along the MU cable 110 from the communication device of the lead vehicle 102 and convey the control signals to the control system 108 of the remote vehicle 102 where the communication device 200, 400 is located. The communication device 200, 400 additionally may communicate the same control signals to other remote vehicles 102 along the MU cable 110 (e.g., using the circuitry 302 and/or drivers 308).

The communication device 200, 400 (e.g., the processors 306) also may look for error states, such as voltages on the MU cable 110 that are not being conveyed along the MU cable 110 as control signals, ground faults, etc. The processors 306 may communicate status signals to output devices onboard the remote vehicle 102 and/or other vehicles 102, record (e.g., log) the state of the data in the control signals communicated to lead vehicle 102 by the communication device 200, 400, etc.

The communication devices 200, 400 also may support a higher speed communication path via the network connections 112 between the communication devices 200, 400 relative to communication of the non-network signals along the MU cable 110. The location of the circuitry 302 in the communication devices can provide the communication devices 200, 400 with higher data rates relative to communication along the MU cable 110, and may improve isolation from onboard sources of noise compared to the communication of signals via the MU cable 110 due to shorter runs of the network connections 112 relative to the MU cable 110.

The processors 306 disposed onboard the remote vehicles can examine operation of the control systems 108 of the remote vehicles and the portions of the communication system 116 onboard the remote vehicles in order to identify faults. These faults may include ground faults, significant electric noise, failure of components, etc. Responsive to identifying a fault on a remote vehicle, the one or more processors 306 onboard the remote vehicle can communicate a signal (e.g., along the MU cable 110 or network connections 112) to the lead vehicle in order to notify the lead vehicle that the remote vehicle is experiencing a fault. This can allow for the control system 108 onboard the lead vehicle to identify locations of faults along the vehicle system and to notify an operator of the fault locations.

Figure 6:
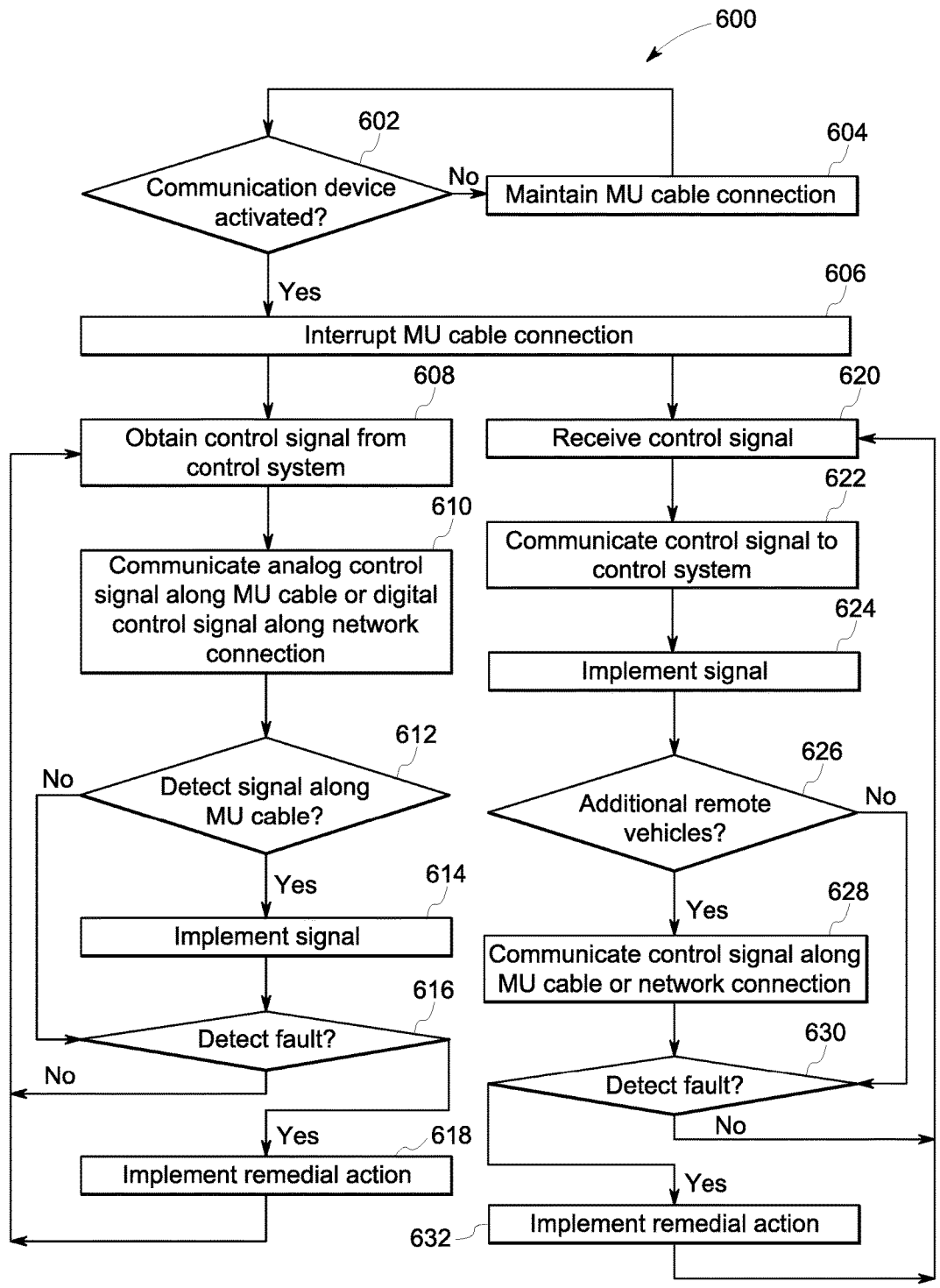
FIG. 6 illustrates one embodiment of a flowchart of a method for communicating between vehicles in a vehicle system.

FIG. 6 illustrates one embodiment of the flowchart of a method 600 for communicating between vehicles in a vehicle system. The method 600 may be performed by one or more components of the communication system 116 shown in FIG. 1. For example, operations described in connection with the flowchart shown in FIG. 6 may represent an algorithm used to dictate or direct operations (whether the operations be autonomously performed without intervention from an operator or at least partially manually implemented by an operator controlling one or more components of the system 116) by one or more the communication devices 200, 400 shown in FIGS. 2 through 5.

At 602, a determination is made as to whether or not the communication device is activated. This determination may be made as to whether or not the communication device 200, 400 disposed onboard one or more of the vehicles is powered on and activated. The communication devices may be inactive when the vehicle on which the communication device is disposed also is deactivated or is operating at idle (for example, not producing tractive effort or breaking effort to modifier control movement of the vehicle system). If the communication device onboard a vehicle is not activated, then flow of the method 600 may proceed to 604. On the other hand, if the communication device is activated, flow of the method 600 may proceed toward 606.

At 604, the connection to an MU cable that extends through the vehicle system may be maintained through the communication device that is deactivated. For example, the relays 314, 402, 404 of the communication devices 200, 400 onboard the vehicle may be kept or switched to a closed position. When the relays are closed, the pathways 300 extending through the communication devices 200, 400 interconnect the portions of the MU cable 110 extending through the vehicle and can continue to conduct or otherwise convey non-network control signals that are communicated along the MU cable 110 along the length of the vehicle system 100. Subsequent to the operations described in connection with 604, flow of the method 600 may return to 602. For example, the method 600 may proceed in a loop-wise manner between 602 and 604 until the communication device or devices onboard a vehicle is activated. Alternatively, flow of the method 600 may terminate subsequent to 604.

At 606, the MU cable connection extending through the vehicle is interrupted. For example, in response to determining that the communication device onboard a vehicle is activated, one or more of the relays 314, 402, 404 in the communication device 200, 400 may be opened. Opening the relays prevents non-network control signals from being communicated through the vehicle along the pathway 300 in the communication device 200, 400. As a result, if a control signal is communicated to the communication device along the MU cable 110, the signal cannot propagate through the communication device to another portion of the MU cable 110 or to another vehicle in the same vehicle system without first being processed as described herein by the communication device 200, 400 that interrupted the connection with the MU cable 110.

Depending on whether the communication device is onboard a lead vehicle or a remote vehicle in the vehicle system, flow of the method 600 may proceed from 606 toward 608 or 620. In one embodiment, if the communication device is disposed onboard a lead vehicle in the vehicle system that is operating in a distributed power state, flow of the method may proceed from 606 toward 608. On the other hand, if the communication device is disposed onboard a remote vehicle in the vehicle system, then flow the method may proceed from 606 toward 620.

At 608, the communication device onboard the lead vehicle obtains a control signal from a control system onboard the same lead vehicle. This control signal can be communicated from the control system 108 to the processors 306 via the switch 304. The control signal may dictate operational settings to be implemented by one or more of the remote vehicles in the vehicle system. For example, the control signal can dictate throttle settings, brake settings, speeds, or the like, of different remote vehicles. The control signal communicated from the control system 108 may be a digital signal. For example, the signal may be arranged in an Internet protocol format, with data packets including different portions of data in the control signal.

At 610, an analog control signal is generated and communicated along the MU cable to one or more of the remote vehicles and/or a digital control signal is communicated to one or more the remote vehicles along a network connection from the communication device. With respect to the analog control signal, the control signal received by the one or more processors 306 via the switch 304 may be used to generate an analog signal, such as a voltage signal, that is applied to the pathway 300 of the communication device. The one or more processors 306 can control the output drivers 308 to create the analog control signal and communicate the analog control signal along the communication pathway 300. The analog control signal may then be communicated from the pathway 300 to one or more portions of the MU cable 110 disposed onboard the lead vehicle and to a remainder of the MU cable 110 disposed outside of the lead vehicle via the MU connector 202. With respect to a digital control signal, the control signal from the control system 108 may be communicated to the network connector 204 via the switch 304. The digital control signal sent from the control system 108 may be conveyed through the switch 304 to the network connector 204 be shown in FIGS. 3 and 5, and may then be communicated to one or more other vehicles via one or more network connections 112 shown in FIG. 1.

At 612, a determination is made as to whether or not a signal is detected along the MU cable. For example, the one or more processors 306 may monitor the input sensors 310 to determine if an analog voltage signal is detected along the pathway 300 from the MU cable 110 and the MU connector 202 onboard the lead vehicle. The signal can represent a responsive message from a remote vehicle, such as an alarm, a confirmation signal, or the like. The input sensors 310 can measure the magnitude and/or changes of the voltage signal on the pathway 300 and communicate this information to the one or more processors 306. The one or more processors 306 can examine the voltages measured on the pathway 300 to determine if these voltages represent a signal from the remote vehicle, or noise on the pathway 300 or the MU cable 110. If the voltage is detected on the pathway 300 does represent a signal communicated from the remote vehicle, then flow the method can proceed toward 614. On the other hand, if no voltages are detected on the pathway 300 or if the voltages detected on the pathway 300 do not represent a signal communicated from a remote vehicle, then flow the method 600 can proceed toward 616.

At 614, one or more operations may be performed to implement the signal received via the MU cable 110 in the pathway 300. For example, if the signal represents an alarm communicated from a remote vehicle, the lead vehicle (for example, the control system 108 onboard the lead vehicle) may notify an operator of the lead vehicle, automatically communicate a signal to an offboard location (for example, a dispatch facility, a repair facility, or the like, in order to schedule repair, inspection, or maintenance of the remote vehicle), to cause the control system 108 to autonomously shut down or otherwise change operation of the remote vehicle, or the like.

At 616, a determination is made as to whether or not a fault is detected along the MU cable. For example, the one or more processors 306 onboard a communication device of the lead vehicle can monitor voltages and/or changes in voltages conducted along the MU cable 110 into the pathway 300. If the voltages indicate a fault or other problem, such as a grounding fault of MU cable 110, significant electric noise conducted along the MU cable 110, or the like, then a fault may be detected by the one or more processors 306 onboard the lead vehicle. As a result, flow of the method 600 can proceed toward 618. If no fault is detected, however, flow of the method may return toward 608 so that one or more additional control signals may be obtained from the control system 108 for remote control of the remote vehicles from the lead vehicle.

At 618, one or more remedial actions may be implemented. For example, responsive to detecting the fault at 616, the lead vehicle (for example, the communication device onboard the lead vehicle) may communicate a signal to the remote vehicle associated with or the cause of the fault and direct the remote vehicle to disconnect the portion of the communication system 116 onboard the remote vehicle from the communication system 116.

As one example, if a ground fault is detected onboard a remote vehicle, the communication device 200, 400 disposed onboard the lead vehicle may communicate a signal to the communication device 200, 400 onboard the remote vehicle and direct the communication device 200, 400 on the remote vehicle to open the relays 314, 402, 404 in order to disconnect the portion of the MU cable 110 disposed onboard the remote vehicle from a remainder of the MU cable of the vehicle system. Optionally, the communication device 200, 400 onboard the lead vehicle may output one or more output signals to an output device, such as a display, speaker, or the like in order to notify an operator of the lead vehicle of the detected fault. Optionally, the communication device 200, 400 onboard the remote vehicle may detect the fault and interrupt the connection of the control system 108 of the remote vehicle from the MU cable 110. Flow of the method 600 may return toward 608.

With respect to the remote vehicles, at 620, a control signal is received by the remote vehicle. The control signal may be received as non-network, or analog, control signal received via one or more of the connectors 202 along the MU cable 110. This analog control signal may be sensed by the input sensors 310 of the communication device 200, 400 onboard the remote vehicle. The sensed signal may be communicated to the one or more processors 306 from the input sensors 310. The one or more processors 306 may identify the instructions included in the control signal and communicate these instructions to the control system 108 via the switch 304. Optionally, the circuitry 302 can detect the data included in the analog control signal conducted to the pathway 300 along the MU cable 110, and communicate this information to the control system 108 via the switch 304. With respect to digital control signals, the digital control signal may be received by the control system 108 via the network connection 112, the network connector 204, and the switch 304.

At 622, the received control signals are communicated to the control system of the remote vehicle. If the control signal is an analog control signal received along the MU cable in the pathway 300, the circuitry 302 may communicate the control signal or the data in the control signal to the control system 108 of the remote vehicle via the switch 304. If the control signal is a digital control signal received from a network connection 112 via the network connector 204, the control signal may be communicated to the control system 108 via the switch 304.

At 624, the control signal is implemented by the control system of the remote vehicle. The control signal may dictate one or more operational settings for the remote vehicle to use in moving along a route. Responsive to receiving the signal, the control system 108 may change a throttle setting, a brake setting, a speed, or other operational setting, or may direct an operator to change the operational setting of the remote vehicle accordingly.

At 626, a determination is made as to whether or not one or more additional remote vehicles are in the vehicle system. For example, if the remote vehicle that received the control signal is between the lead vehicle and one or more other remote vehicles, then the remote vehicle may need to communicate the received control signal to one or more additional remote vehicles. The lead vehicle may communicate the control signal via the MU cable so that multiple remote vehicles receive the control signal. Because the communication device onboard the remote vehicle that received the control signal may have interrupted MU cable connection, however, the communication device on the remote vehicle may need to communicate the control signal to one or more additional remote vehicles. If there are additional remote vehicles in the vehicle system, flow of the method can proceed toward 628. If, on the other hand, there are no additional remote vehicles (the remote vehicle is the last of the remote vehicles or is the only remote vehicle) that flow of the method 600 can proceed toward 630.

At 628, the control signal is communicated to one or more additional remote vehicles. The communication device 200, 400 may communicate to control signal received from the lead vehicle as an analog control signal along the pathway 300 and MU cable 110 to the additional remote vehicle or vehicles. For example, the one or more processors 306 may direct the output drivers 308 to apply voltages to the pathway 300 to form the analog control signal. The signal may then be communicated along the MU cable 110 via the MU connector 202 to the one or more additional remote vehicles. With respect to digital control signals, the control signal may be communicated to one or more additional remote vehicles via the network connector 204 and one or more network connections 112.

At 630, a determination is made as to whether or not a fault is detected along the MU cable or elsewhere in the control system and/or communication device of the remote vehicle. For example, the one or more processors 306 onboard a communication device of the remote vehicle can monitor voltages and/or changes in voltages conducted along the MU cable 110 into the pathway 300, along the pathway 300, or elsewhere in the control system 108 and communication device. If the voltages indicate a fault or other problem, such as a grounding fault of MU cable 110, significant electric noise conducted along the MU cable 110, or the like, that a fault may be detected by the one or more processors 306 onboard the remote vehicle. As a result, flow of the method 600 can proceed toward 632. If no fault is detected, however, flow of the method may return toward 620 so that one or more additional control signals may be received.

At 632, one or more remedial actions may be implemented. For example, responsive to detecting the fault, the remote vehicle (for example, the communication device onboard the lead vehicle) may communicate a signal to the lead vehicle and/or disconnect the portion of the communication system 116 onboard the remote vehicle from the communication system 116. As one example, if the ground fault is detected onboard the remote vehicle, the communication device 200, 400 disposed onboard the remote vehicle may open the relays 314, 402, 404 onboard the remote vehicle in order to disconnect the portion of the MU cable 110 disposed onboard the remote vehicle from a remainder of the MU cable 110. Optionally, the communication device 200, 400 onboard the remote vehicle may communicate a signal to the lead vehicle to cause the lead vehicle to output one or more output signals to an output device, such as a display, speaker, or the like in order to notify an operator of the lead vehicle of the detected fault. Flow of the method 600 may return toward 620.

In one embodiment of the inventive subject matter described herein, a communication device includes an analog connector configured to be disposed onboard a first vehicle of plural vehicles in a vehicle system and to conductively couple with a multiple unit (MU) cable that extends through and conductively couples the vehicles for communication of analog control signals among control systems of the vehicles via the MU cable. The device also includes a network connector configured to be disposed onboard the first vehicle to communicatively couple with a digital communication network of the vehicle system that is separate from the MU cable. The device also includes a relay configured to be disposed onboard the first vehicle to close and conductively couple the control system of the first vehicle with the MU cable. The relay also can be configured to open to decouple a portion of the MU cable disposed onboard the first vehicle with a remainder of the MU cable that is off-board the first vehicle. The relay can be configured to close to communicate the analog control signals between the control systems of the vehicles via the MU cable during a time period that the relay is closed and isolate the portion of the MU cable that is onboard the first vehicle from the remainder of the MU cable during a different time period that the relay is opened.

In one aspect, the device also includes one or more processors configured to identify a fault onboard the first vehicle involving the MU cable and to communicate a fault signal via the network connector to another vehicle of the vehicles. The fault signal one or more of represents a location of the fault onboard the first vehicle and/or identifies the first vehicle as associated with the fault.

In one aspect, the relay is configured to close responsive to the communication device turning off in order to maintain communication of the analog control signals along the MU cable through the first vehicle to one or more additional vehicles of the vehicle system.

In one aspect, the relay is configured to open responsive to the communication device turning on in order to prevent communication of the analog control signals along the MU cable through the first vehicle to one or more additional vehicles of the vehicle system.

In one aspect, the analog control signals include network data modulated in the analog control signals, and the device also can include network transceiving circuitry configured to demodulate the analog control signals that are received along the MU cable and to communicate the network data to the control system of the first vehicle.

In one aspect, the device also can include one or more output drivers configured to apply a voltage to the MU cable onboard the first vehicle in order to generate one or more additional analog control signals for communication along the MU cable.

In one aspect, the device also can include one or more processors configured to communicate the analog control signals via the analog connector and MU cable and to communicate digital control signals via the network connector and the communication network for one or more of remote control of the first vehicle by another vehicle of the vehicles in the vehicle system or remote control of one or more other vehicles by the first vehicle.

In one aspect, the network connector can include an Ethernet connector configured to couple the control system of the first vehicle with an Ethernet network for communication of the digital control signals.

In one embodiment, a communication system includes a first communication device configured to be disposed onboard a first vehicle of plural vehicles in a vehicle system and a second communication device configured to be disposed onboard a second vehicle of the vehicles in the vehicle system. Each of the first and second communication devices can include analog connectors configured to be conductively coupled with a multiple unit (MU) cable that extends through and conductively couples the vehicles of the vehicle system for communication of analog control signals among control systems of the vehicles via the MU cable. At least one of the first or second communication devices including a network connector configured to be disposed onboard the first vehicle to communicatively couple with a digital communication network of the vehicle system that is separate from the MU cable. At least one of the first or second communication devices includes a relay configured to close and conductively couple the control system of the first vehicle with the MU cable and to open to decouple a portion of the MU cable disposed onboard the first vehicle between the first and second communication devices with a remainder of the MU cable that is off-board the first vehicle. The relay can be configured to close to communicate the analog control signals between the control systems of the vehicles via the MU cable during a time period that the relay is closed and isolate the portion of the MU cable that is onboard the first vehicle from the remainder of the MU cable during a different time period that the relay is opened.

In one aspect, the first communication device is configured to be disposed closer to one end of the first vehicle than the second communication device. The second communication device is configured to be disposed closer to an opposite end of the first vehicle than the first communication device.

In one aspect, at least one of the first or second communication device includes one or more processors configured to identify a fault onboard the first vehicle involving the MU cable and to communicate a fault signal via the network connector to another vehicle of the vehicles. The fault signal one or more of represents a location of the fault onboard the first vehicle and/or identifies the first vehicle as associated with the fault.

In one aspect, the relay is configured to close responsive to one or more of the first and/or second communication device turning off in order to maintain communication of the analog control signals along the MU cable through the first vehicle to one or more additional vehicles of the vehicle system.

In one aspect, the relay is configured to open responsive to one or more of the first and/or second communication device turning on in order to prevent communication of the analog control signals along the MU cable through the first vehicle to one or more additional vehicles of the vehicle system.

In one aspect, the analog control signals include network data modulated in the analog control signals. At least one of the first and/or second communication devices can include network transceiving circuitry configured to demodulate the analog control signals that are received along the MU cable and to communicate the network data to the control system of the first vehicle.

In one aspect, at least one of the first or second communication devices includes one or more output drivers configured to apply a voltage to the MU cable onboard the first vehicle in order to generate one or more additional analog control signals for communication along the MU cable.

In one aspect, at least one of the first or second communication devices includes one or more processors configured to communicate the analog control signals via the analog connector and MU cable and to communicate digital control signals via the network connector and the communication network for one or more of remote control of the first vehicle by another vehicle of the vehicles in the vehicle system or remote control of one or more other vehicles by the first vehicle.

In one aspect, the network connector includes an Ethernet connector configured to couple the control system of the first vehicle with an Ethernet network for communication of the digital control signals.

In one embodiment, a method (e.g., for communicating between vehicles) includes, responsive to activation of a communication device onboard a first vehicle of plural vehicles in a vehicle system having a multiple unit (MU) cable extending through and conductively coupling the vehicles, opening a relay onboard the first vehicle to disconnect at least a portion of the MU cable onboard the first vehicle from a remainder of the MU cable disposed off-board the first vehicle, receiving an analog control signal communicated via the MU cable at the first vehicle, and communicating the analog control signal to a control system of the first vehicle as a digital control signal in order to remotely control movement of the first vehicle from another vehicle in the vehicle system.

In one aspect, the method also includes opening the relay onboard the first vehicle responsive to detecting a fault in one or more of the communication device or the control system of the first vehicle.

In one aspect, the method also includes communicating a fault signal from the first vehicle to another vehicle of the vehicle system via a digital network of the vehicle system responsive to detecting a fault in one or more of the communication device or the control system of the first vehicle.

In one embodiment, a communication device for a first vehicle includes an analog connector configured to be disposed onboard the first vehicle and to conductively couple with a cable bus that extends through the first vehicle. The communication device is configured to conductively couple the first vehicle with one or more other vehicles of a vehicle system, for communication of at least analog control signals among control systems of the vehicles via the cable bus. The device also can include a network connector configured to be disposed onboard the first vehicle to communicatively couple with a digital communication network of the vehicle system that is separate from the cable bus. The device can include a relay configured to be disposed onboard the first vehicle and operable to a closed state and an open state. In the open state, the relay electrically disconnects a first portion of the cable bus from a second portion of the cable bus. In the closed state, the relay electrically connects the first portion of the cable bus to the second portion.

In one embodiment, a communication device includes a cable bus disposed onboard a first vehicle and connected to at least one externally accessible analog connector to conductively couple the first vehicle with one or more other vehicles of a vehicle system, for communication of at least analog control signals between the vehicles via the cable bus. The device can include a network bus disposed on board the first vehicle and connected to at least one network connector to conductively couple the first vehicle with the one or more other vehicles of the vehicle system, for communication of network data between the vehicles via the network bus. The device can include a relay electrically connected to the cable bus and operable to establish, in a first mode of operation, an electrical connection between portions of the cable bus on either side of the relay, and in a second mode of operation, an open circuit condition between the portions of the cable bus.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to those of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and to enable a person of ordinary skill in the art to practice the embodiments of inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" or "an embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods for communicating data in a vehicle consist, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A communication device comprising:
    an analog connector configured to be disposed onboard a first vehicle of plural vehicles in a vehicle system and to conductively couple with a multiple unit (MU) cable that extends through and conductively couples the vehicles for communication of analog control signals among control systems of the vehicles via the MU cable;
    a network connector configured to be disposed onboard the first vehicle to communicatively couple with a digital communication network of the vehicle system that is separate from the MU cable; and
    a relay configured to be disposed onboard the first vehicle to close and conductively couple the control system of the first vehicle with the MU cable, the relay also configured to open to decouple a portion of the MU cable disposed onboard the first vehicle with a remainder of the MU cable that is off-board the first vehicle, wherein the relay is configured to close to communicate the analog control signals between the control systems of the vehicles via the MU cable during a time period that the relay is closed and isolate the portion of the MU cable that is onboard the first vehicle from the remainder of the MU cable during a different time period that the relay is opened.

2. The communication device of claim 1, further comprising one or more processors configured to identify a fault onboard the first vehicle involving the MU cable and to communicate a fault signal via the network connector to another vehicle of the vehicles, wherein the fault signal one or more of represents a location of the fault onboard the first vehicle or identifies the first vehicle as associated with the fault.

3. The communication device of claim 1, wherein the relay is configured to close responsive to the communication device turning off in order to maintain communication of the analog control signals along the MU cable through the first vehicle to one or more additional vehicles of the vehicle system.

4. The communication device of claim 1, wherein the relay is configured to open responsive to the communication device turning on in order to prevent communication of the analog control signals along the MU cable through the first vehicle to one or more additional vehicles of the vehicle system.

5. The communication device of claim 1, wherein the analog control signals include network data modulated in the analog control signals, and further comprising network transceiving circuitry configured to demodulate the analog control signals that are received along the MU cable and to communicate the network data to the control system of the first vehicle.

6. The communication device of claim 1, further comprising one or more output drivers configured to apply a voltage to the MU cable onboard the first vehicle in order to generate one or more additional analog control signals for communication along the MU cable.

7. The communication device of claim 1, further comprising one or more processors configured to communicate the analog control signals via the analog connector and MU cable and to communicate digital control signals via the network connector and the communication network for one or more of remote control of the first vehicle by another vehicle of the vehicles in the vehicle system or remote control of one or more other vehicles by the first vehicle.

8. The communication device of claim 7, wherein the network connector includes an Ethernet connector configured to couple the control system of the first vehicle with an Ethernet network for communication of the digital control signals.

9. A communication system comprising:
    a first communication device configured to be disposed onboard a first vehicle of plural vehicles in a vehicle system; and
    a second communication device configured to be disposed onboard a second vehicle of the vehicles in the vehicle system, each of the first and second communication devices including analog connectors configured to be conductively coupled with a multiple unit (MU) cable that extends through and conductively couples the vehicles of the vehicle system for communication of analog control signals among control systems of the vehicles via the MU cable, at least one of the first or second communication devices including a network connector configured to be disposed onboard the first vehicle to communicatively couple with a digital communication network of the vehicle system that is separate from the MU cable, at least one of the first or second communication devices including a relay configured to close and conductively couple the control system of the first vehicle with the MU cable and to open to decouple a portion of the MU cable disposed onboard the first vehicle between the first and second communication devices with a remainder of the MU cable that is off-board the first vehicle, wherein the relay is configured to close to communicate the analog control signals between the control systems of the vehicles via the MU cable during a time period that the relay is closed and isolate the portion of the MU cable that is onboard the first vehicle from the remainder of the MU cable during a different time period that the relay is opened.

10. The communication system of claim 9, wherein the first communication device is configured to be disposed closer to one end of the first vehicle than the second communication device, and the second communication device is configured to be disposed closer to an opposite end of the first vehicle than the first communication device.

11. The communication system of claim 9, wherein at least one of the first or second communication device includes one or more processors configured to identify a fault onboard the first vehicle involving the MU cable and to communicate a fault signal via the network connector to another vehicle of the vehicles, wherein the fault signal one or more of represents a location of the fault onboard the first vehicle or identifies the first vehicle as associated with the fault.

12. The communication system of claim 9, wherein the relay is configured to close responsive to one or more of the first or second communication device turning off in order to maintain communication of the analog control signals along the MU cable through the first vehicle to one or more additional vehicles of the vehicle system.

13. The communication system of claim 9, wherein the relay is configured to open responsive to one or more of the first or second communication device turning on in order to prevent communication of the analog control signals along the MU cable through the first vehicle to one or more additional vehicles of the vehicle system.

14. The communication system of claim 9, wherein the analog control signals include network data modulated in the analog control signals, and wherein at least one of the first or second communication device includes network transceiving circuitry configured to demodulate the analog control signals that are received along the MU cable and to communicate the network data to the control system of the first vehicle.

15. The communication system of claim 9, wherein at least one of the first or second communication devices includes one or more output drivers configured to apply a voltage to the MU cable onboard the first vehicle in order to generate one or more additional analog control signals for communication along the MU cable.

16. The communication system of claim 9, wherein at least one of the first or second communication devices includes one or more processors configured to communicate the analog control signals via the analog connector and MU cable and to communicate digital control signals via the network connector and the communication network for one or more of remote control of the first vehicle by another vehicle of the vehicles in the vehicle system or remote control of one or more other vehicles by the first vehicle.

17. The communication system of claim 16, wherein the network connector includes an Ethernet connector configured to couple the control system of the first vehicle with an Ethernet network for communication of the digital control signals.

* * * * *